US012681468B2

(12) United States Patent
Mizumi et al.

(10) Patent No.: US 12,681,468 B2
(45) Date of Patent: Jul. 14, 2026

(54) DATA PROCESSING DEVICE AND DATA PROCESSING METHOD

(71) Applicant: MITSUBISHI HEAVY INDUSTRIES, LTD., Tokyo (JP)

(72) Inventors: Shunsuke Mizumi, Tokyo (JP); Naoto Omura, Tokyo (JP); Takeo Tokumoto, Tokyo (JP); Ryuji Iwamoto, Tokyo (JP); Shoichiro Hosomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 18/687,923

(22) PCT Filed: Jan. 25, 2023

(86) PCT No.: PCT/JP2023/002228
§ 371 (c)(1),
(2) Date: Feb. 29, 2024

(87) PCT Pub. No.: WO2023/199567
PCT Pub. Date: Oct. 19, 2023

(65) Prior Publication Data
US 2025/0130558 A1 Apr. 24, 2025

(30) Foreign Application Priority Data
Apr. 12, 2022 (JP) ................................ 2022-065664

(51) Int. Cl.
*G05B 19/418* (2006.01)
(52) U.S. Cl.
CPC ................. *G05B 19/41875* (2013.01); *G05B 2219/32366* (2013.01)

(58) Field of Classification Search
CPC ................ G05B 19/41875; G05B 2219/32366
See application file for complete search history.

(56) References Cited

U.S. PATENT DOCUMENTS

| 2004/0249592 A1 | 12/2004 | Koukol et al. |
| 2017/0116319 A1 | 4/2017 | Zhou |
| 2018/0137277 A1 | 5/2018 | Mestha et al. |

FOREIGN PATENT DOCUMENTS

| JP | 2020-201890 A | 12/2020 |
| JP | 2021-111207 A | 8/2021 |

OTHER PUBLICATIONS

International Search Report dated Apr. 4, 2023, issued in counterpart JP Application No. PCT/JP2023/002228, with English translation. (4 pages).

*Primary Examiner* — Gary Collins
(74) *Attorney, Agent, or Firm* — WHDA, LLP

(57) ABSTRACT

A data processing device comprises a division unit that divides a target period into a plurality of operating periods according to an operating condition; an identification unit that identifies a standard condition for each operating period; a calculation unit that divides each operating period into a plurality of constant performance periods in each of which the performance of a target device is considered to be constant, narrows down time series data for each constant performance period on the basis of the standard condition, and calculates a certain representative value on the basis of the time series data extracted through the narrowing down; and a correction unit that sets an overlapping period containing a boundary between two adjacent operating periods, narrows down, on the basis of each standard condition identified for each of the two operating periods, time series data in the overlapping period for each standard condition.

8 Claims, 11 Drawing Sheets

DATA PROCESSING DEVICE AND DATA PROCESSING METHOD

TECHNICAL FIELD

The present disclosure relates to a data processing device and a data processing method. Priority is claimed to Japanese Patent Application No. 2022-065664, filed Apr. 12, 2022, the contents of which are incorporated herein by reference.

BACKGROUND ART

PTL 1 discloses a plant performance evaluation system as follows. That is, the plant performance evaluation system described in PTL 1 examines a relationship between sensors using measurement values of the sensors, and creates a model of a plant from the relationship. Then, the plant performance evaluation system calculates a measurement value of each sensor at the time of creating the model, and a predicted measurement value from measurement values received from each sensor over a predetermined period based on the model. Further, the plant performance evaluation system compares the calculated measurement value and the measurement value received from each sensor over the predetermined period, and uses the comparison result as an evaluation result of the plant. In the system described in PTL 1, a deterioration tendency is detected by examining the change in the strength of the relationship between the sensors, rather than comparing the past and present values of individual sensors attached to a device.

In the plant performance evaluation system described in PTL 1, a process of discretizing and thinning out the measurement values, a process of removing outliers from the discretized measurement values, a process of removing seasonal variation components from the discretized measurement values, and the like are performed for the measurement values of the sensor. It is assumed that the creation of a model corresponding to the original state of the plant is achieved by correcting the measurement values through these processes.

CITATION LIST

Patent Literature

[PTL 1] Japanese Unexamined Patent Application Publication No. 2021-111207

SUMMARY OF INVENTION

Technical Problem

In the performance evaluation of various devices in the plant or the like, a value or an index representing the performance to be evaluated may be affected by a change in an operation condition of the device. For example, a value such as efficiency representing the performance of the device may be affected by a change in an operation condition of the device such as a pressure or a temperature. In the evaluation of such a value or an index, there is a problem in that it is difficult to ascertain the deterioration tendency of the device in a case where the operation condition is changed.

The present disclosure has been made in view of the above circumstances, and an object thereof is to provide a data processing device and a data processing method capable of properly evaluating performance of a target device even in a case where an operation condition is changed.

Solution to Problem

In order to solve the above problems, a data processing device according to the present disclosure includes: an acquisition unit that acquires a plurality of types of time-series data over a target period related to an operation of a target device; a division unit that divides the target period into a plurality of operation periods according to operation conditions; a specifying unit that specifies a standard condition, which is a standard operation condition, for each operation period; a calculation unit that divides each operation period into a plurality of constant performance periods in which a performance of the target device is considered to be constant, that performs selection of the time-series data based on the standard condition for each constant performance period, and that calculates a predetermined representative value based on the time-series data extracted by the selection; and a correction unit that sets an overlap period including a boundary between two adjacent operation periods, that performs selection of the time-series data within the overlap period for each standard condition based on each standard condition specified for the two operation periods, and that corrects the representative value in at least one of the two operation periods based on a result of calculating each representative value based on each piece of time-series data extracted by the selection.

A data processing method according to the present disclosure includes: a step of acquiring a plurality of types of time-series data over a target period related to an operation of a target device; a step of dividing the target period into a plurality of operation periods according to operation conditions; a step of specifying a standard condition, which is a standard operation condition, for each operation period; a step of dividing each operation period into a plurality of constant performance periods in which a performance of the target device is considered to be constant, performing selection of the time-series data based on the standard condition for each constant performance period, and calculating a predetermined representative value based on the time-series data extracted by the selection; and a step of setting an overlap period including a boundary between two adjacent operation periods, performing selection of the time-series data within the overlap period for each standard condition based on each standard condition specified for the two operation periods, and correcting the representative value in at least one of the two operation periods based on a result of calculating each representative value based on each piece of time-series data extracted by the selection.

Advantageous Effects of Invention

According to the data processing device and the data processing method of the present disclosure, it is possible to properly evaluate the performance of the target device even in a case where the operation condition is changed.

BRIEF DESCRIPTION OF DRAWINGS

FIG. 1 is a block diagram showing a configuration example of a data processing device according to an embodiment of the present disclosure.

FIG. 7 is a schematic diagram for describing an operation example of the data processing device according to the embodiment of the present disclosure.

FIG. 12 is a schematic diagram for describing the data processing device according to the second embodiment of the present disclosure.

DESCRIPTION OF EMBODIMENTS

First Embodiment (Configuration of Data Processing Device)

Figure 1:
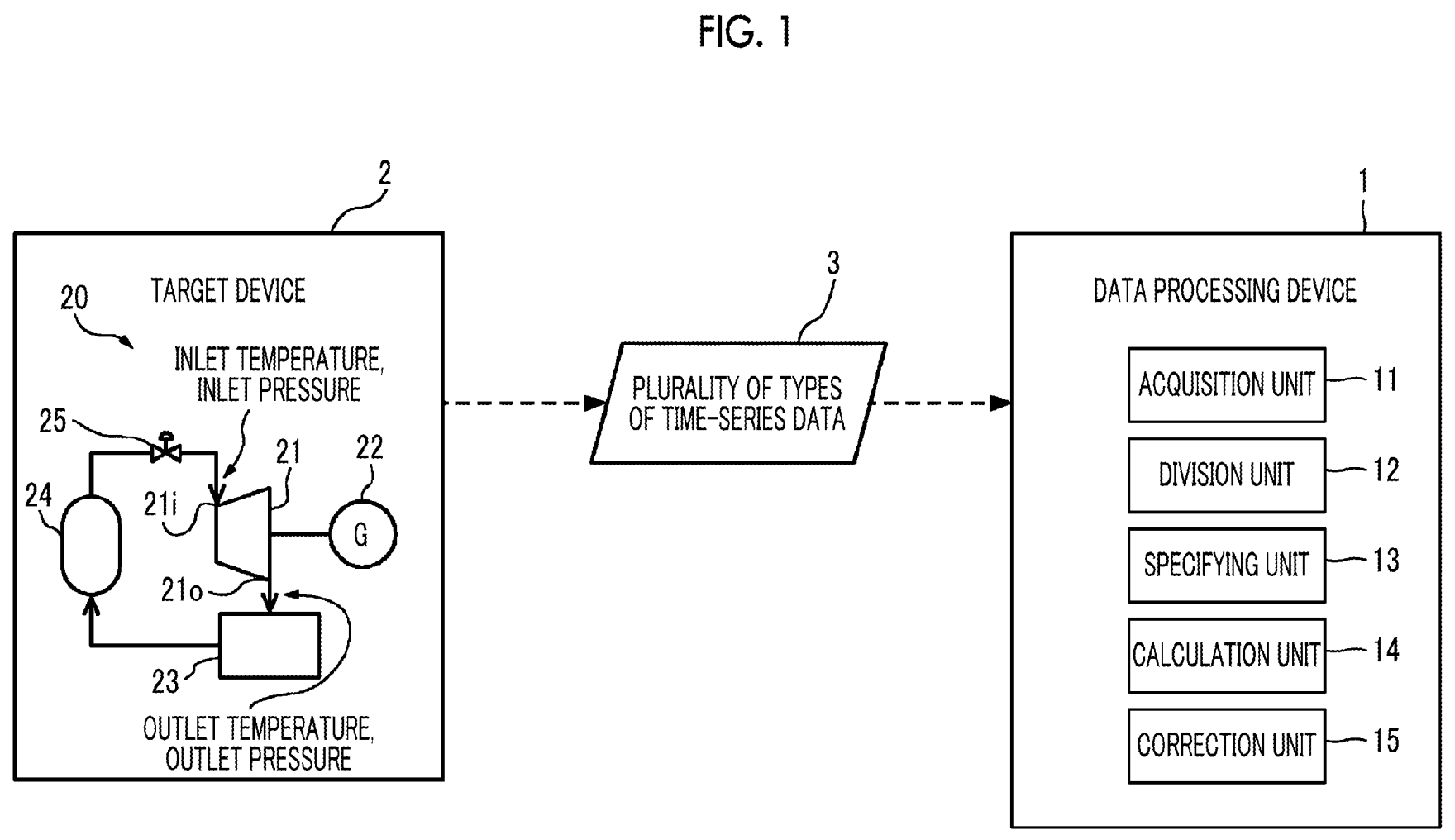
Figure 2:
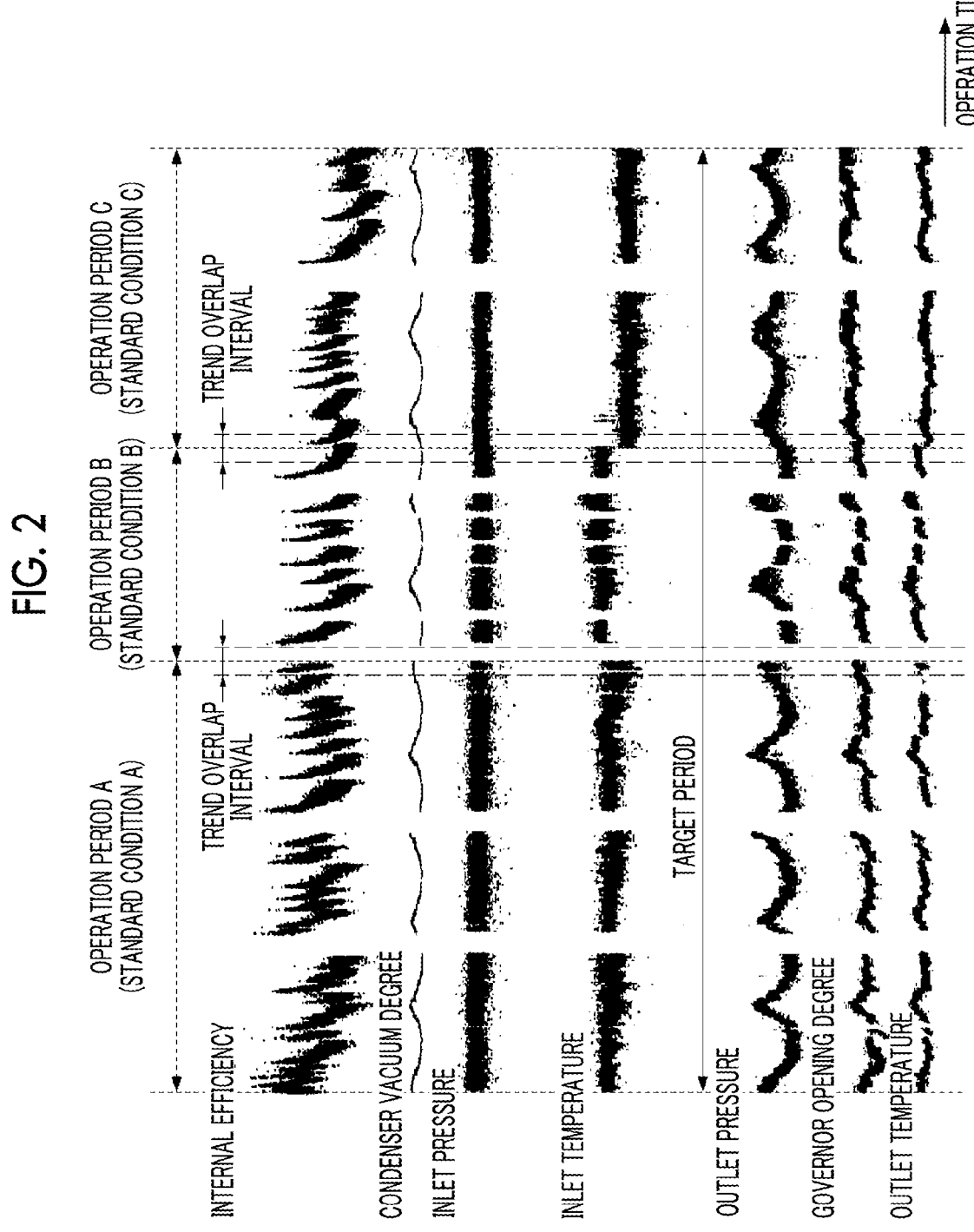
FIG. 2 is a schematic diagram for describing an operation example of the data processing device according to the embodiment of the present disclosure.
Figure 3:
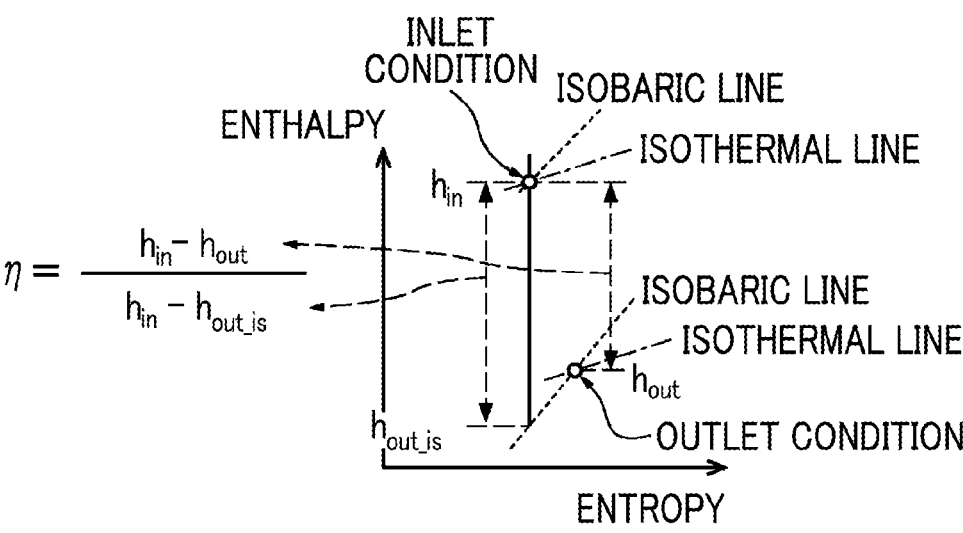
FIG. 3 is a schematic diagram for describing an operation example of the data processing device according to the embodiment of the present disclosure.
Figure 4:
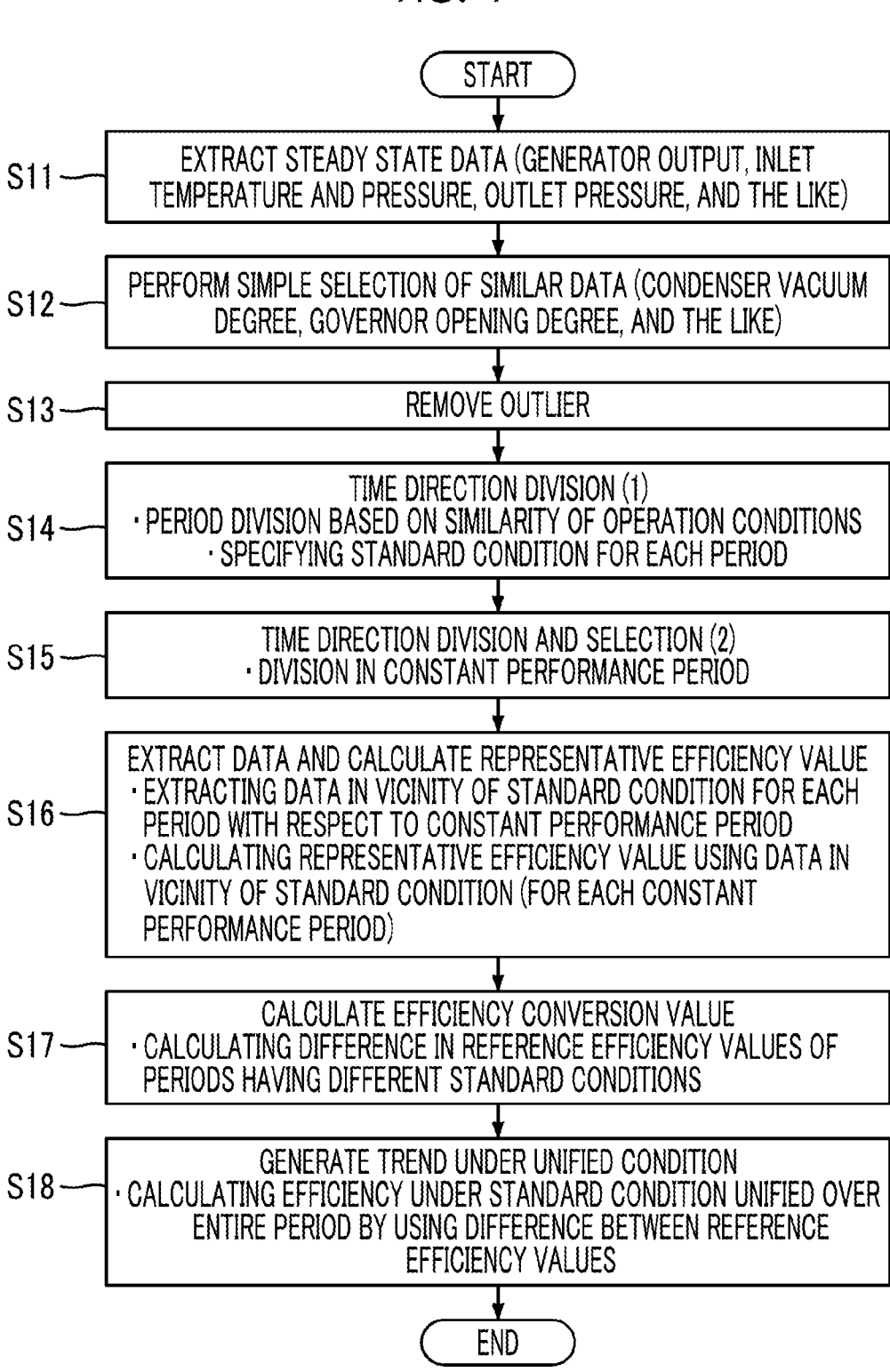
FIG. 4 is a flowchart for describing an operation example of the data processing device according to the embodiment of the present disclosure.

Hereinafter, a data processing device and a data processing method according to the embodiment of the present disclosure will be described with reference to FIG. 1 to FIG. 10. FIG. 1 is a block diagram showing a configuration example of the data processing device according to the embodiment of the present disclosure. FIGS. 2 and 3 are schematic diagrams for describing operation examples of the data processing device according to the embodiment of the present disclosure. FIG. 4 is a flowchart for describing an operation example of the data processing device according to the embodiment of the present disclosure. FIGS. 5 to 10 are schematic diagrams for describing operation examples of the data processing device according to the embodiment of the present disclosure. In each drawing, the same reference numerals will be assigned to the same or corresponding configurations, and description thereof will be omitted as appropriate.

A data processing device 1 shown in FIG. 1 can be configured by using, for example, a computer such as a personal computer and its peripheral devices. The data processing device 1 shown in FIG. 1 includes an acquisition unit 11, a division unit 12, a specifying unit 13, a calculation unit 14, and a correction unit 15, as a functional configuration composed of a combination of hardware such as the computer and its peripheral devices and software such as a program executed by the computer.

In the present embodiment (and second and third embodiments below), a target device 2 to be evaluated includes, for example, a steam turbine power generation system 20 or a steam turbine 21 in the steam turbine power generation system 20. It should be noted that the target device 2 is not limited to this configuration.

In FIG. 1, the steam turbine power generation system 20 includes, as a schematic configuration, the steam turbine 21, a generator 22, a condenser 23, a boiler 24, and a governor valve 25. Steam generated in the boiler 24 flows from a steam turbine inlet portion 21*i* to the steam turbine 21 via the governor valve 25. The steam turbine 21 rotates an internal impeller (not shown) using energy of the steam and drives the generator 22. The steam turbine 21 discharges the steam from a steam turbine outlet portion 210, the condenser 23 converts the steam back to water, and the water is returned to the boiler 24 via a water supply pump (not shown). In the present embodiment, a steam temperature at the steam turbine inlet portion 21*i* is referred to as an inlet temperature, and a steam pressure is referred to as an inlet pressure. In addition, a steam temperature at the steam turbine outlet portion 210 is referred to as an outlet temperature, and a steam pressure is referred to as an outlet pressure. The steam turbine power generation system 20 transmits and accumulates a plurality of types of time-series data 3 indicating a detection result of various types of sensors, an operation state of various types of actuators, an occurrence situation of a predetermined event, and the like to, for example, a server (not shown). The data processing device 1 acquires the accumulated plurality of types of time-series data 3 from the server or the like, or receives the time-series data 3 directly from the steam turbine power generation system 20.

FIG. 2 shows an example of the plurality of types of time-series data 3. A horizontal axis represents an operation time, and a vertical axis represents internal efficiency, a condenser vacuum degree, the inlet pressure, the inlet temperature, the outlet pressure, a governor opening degree, and the outlet temperature. FIG. 2 shows values measured over 10 years at a predetermined cycle and calculated values based on the measured values. In the present embodiment, a target period for evaluation is divided into a plurality of operation periods, a standard condition is specified for each operation period, and the time-series data is processed using different standard conditions for each operation period.

In the present embodiment, the operation period is a period in which operation states are similar. The period in which the operation states are similar is, for example, a period in which average values or fluctuation ranges of values such as a generator output, the inlet temperature, the inlet pressure, the outlet pressure, the condenser vacuum degree, and the governor opening degree are similar. In addition, the standard condition means the standard or average heat condition in each operation period. In the present embodiment, the standard condition is mainly defined by a temperature and a pressure of the turbine inlet and outlet, and by the condenser vacuum degree. The target period is divided into an operation period A, an operation period B, and an operation period C in the example shown in FIG. 2. In addition, a standard condition A, a standard condition B, and a standard condition C are specified for the operation period A, the operation period B, and the operation period C. The temperature of the boiler 24 changes in the operation period A, the operation period B, and the operation period C in the example shown in FIG. 2.

In addition, in the present embodiment, as an example, the internal efficiency of the steam turbine 21 in the target device 2 is considered as the value to be evaluated. A method for calculating the internal efficiency will be briefly described with reference to FIG. 3. FIG. 3 is a Mollier diagram (or an h-s diagram), and is a diagram showing a steam table with entropy on the horizontal axis and enthalpy on the vertical axis. The internal efficiency of the turbine is a ratio of heat energy converted into work inside the turbine to heat energy (adiabatic heat drop) that can be utilized until the steam at the turbine inlet reaches the pressure at the outlet. Specifically, the internal efficiency of the turbine is calculated by obtaining the enthalpy and the entropy of the turbine inlet and outlet using the steam table from the temperature and the pressure at the turbine inlet and outlet and by using the equation shown in FIG. 3. When the heat conditions are different, the calculated efficiency of the same turbine is different. The value of the internal efficiency can be calculated based on each value of the inlet temperature, the inlet pressure, the outlet temperature, and the outlet pressure of the steam turbine 21.

Returning to FIG. 1, the acquisition unit 11 acquires the plurality of types of time-series data 3 over the target period related to the operation of the target device 2.

The division unit 12 divides the target period into a plurality of operation periods according to the operation conditions. For example, the operation period can be divided by displaying the time-series data on a predetermined display unit as shown in FIG. 2 and by setting a division position according to an input operation of an operator for a predetermined input unit. Alternatively, for example, the division position may be set based on a notification indicating a change in the operation condition from the steam turbine power generation system 20.

The specifying unit 13 specifies a standard condition, which is a standard operation condition, for each operation period. The specifying unit 13 obtains, for example, each average value of the inlet temperature, the inlet pressure, the outlet temperature, and the outlet pressure in each operation period, and defines standard condition with each obtained average value.

The calculation unit 14 divides each operation period into a plurality of constant performance periods in which the performance of the target device 2 is considered to be constant, and performs selection of the time-series data based on the standard condition, for each constant performance period, and calculates a predetermined representative value based on the time-series data extracted by the selection. The constant performance period is, for example, a period in which a decrease in performance can be ignored on the assumption that the performance of the target device 2 gradually decreases. For example, in a case where the product life is several decades, when the operation period is sufficiently shorter than the product life, the constant performance period can be set to a period of about one week to several weeks or to a period of about one to two months. However, the length of these periods is just one example, and may be shorter or longer than the above-described examples. In the present embodiment, the constant performance period is a period in which true turbine efficiency is considered to be constant. During that period, it is assumed that the efficiency value is the same if the operation conditions of the turbine are the same (if the turbine structure is the same and the heat conditions are the same, the efficiency should be the same). In the present embodiment, the constant performance period refers to a period in which the efficiency is constant (constant efficiency period).

The selection of the time-series data based on the standard condition is to suppress the range of values of data within a certain range by extracting the data in a vicinity of the standard condition and not extracting the data that deviates from the standard condition. In addition, the calculation of the predetermined representative value based on the time-series data extracted by the selection is to calculate a plurality of values of the internal efficiency by using a plurality of combinations of the inlet temperature, the inlet pressure, and the outlet pressure selected in the vicinity of the standard condition (data with the same time stamp) and the outlet temperature corresponding to the combination (data with the same time stamp), and to further calculate a plurality of average values of the internal efficiency as the predetermined representative value in the present embodiment. In this case, the outlet temperature is not a target of the selection based on the standard condition. That is, in this case, the calculation unit 14 excludes at least one type of time-series data of the plurality of types of time-series data used as a parameter when calculating the representative value from the selection based on the standard condition. Hereinafter, the representative value is also referred to as a representative efficiency value.

Figure 7:
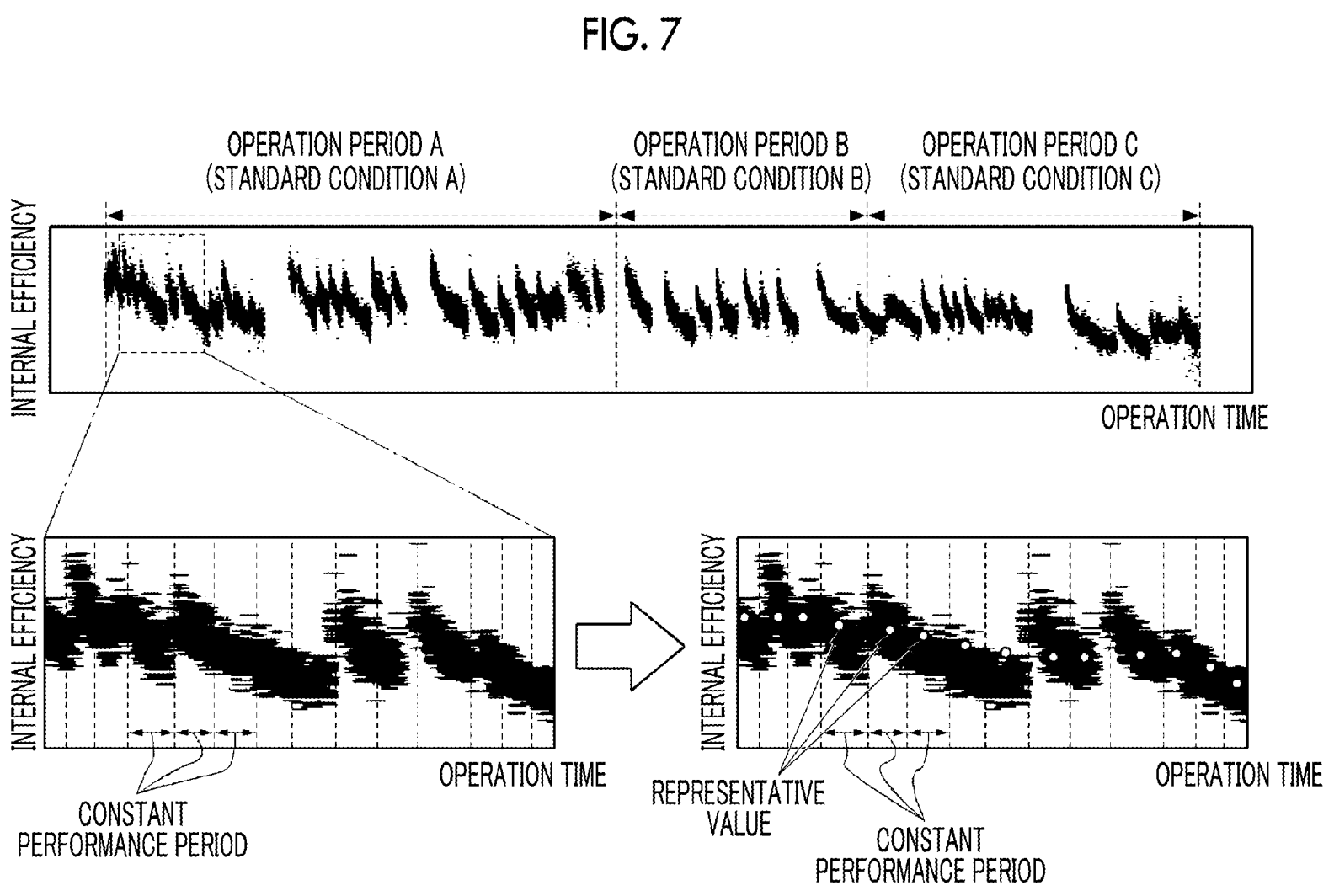

FIG. 7 shows an example of a relationship between the operation period and the constant performance period. The horizontal axis represents the operation time, and shows an example of a change in the internal efficiency. A representative value is calculated for each constant performance period. The length of the constant performance period may be the same for all or may not be the same.

Here, a specific example of the selection of the time-series data based on the standard condition will be described with reference to FIG. 9. The standard condition in the present embodiment includes, for example, values representing three of the inlet temperature, the inlet pressure, the outlet temperature, and the outlet pressure of the steam turbine, which are calculation parameters of the internal efficiency. The standard condition in the example shown in FIG. 9 includes the inlet temperature, the inlet pressure, and the outlet pressure of the steam turbine, which are the calculation parameters of the internal efficiency. In the example shown in FIG. 9, the calculation unit 14 associates three calculation parameters corresponding to an inlet temperature Tin, an inlet pressure Pin, and an outlet pressure Pout included in the standard condition with each side, and disposes all time-series data D1 in the constant performance period in a cuboid space QB1 set for each constant performance period. In addition, the calculation unit 14 calculates the representative efficiency value based on the time-series data disposed in a predetermined cube QB2 in the vicinity of the standard condition.

Figure 9:
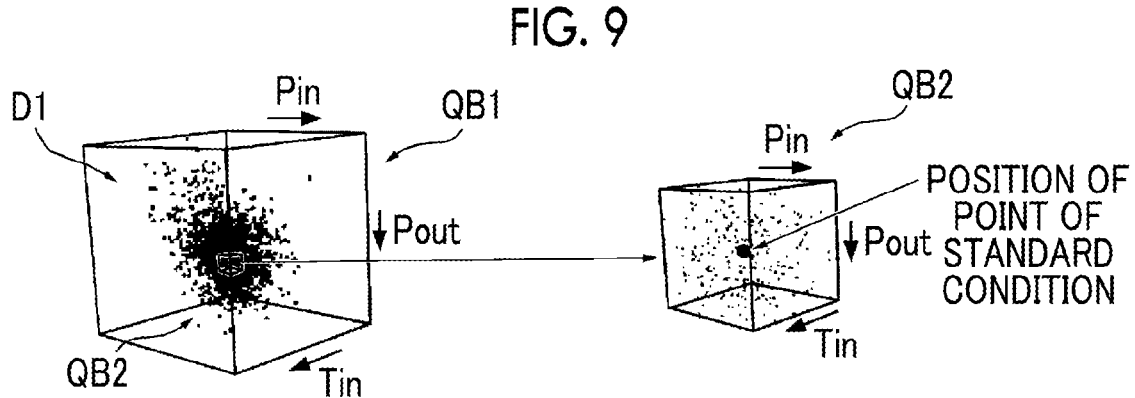
FIG. 9 is a schematic diagram for describing an operation example of the data processing device according to the embodiment of the present disclosure.

In the present embodiment, the selection method shown in FIG. 9 is referred to as a large-small cube method. In the large-small cube method, the selection in a time direction is performed in a large cube (cuboid space QB1). Each cube corresponds to the time-series data D1 of the individual constant performance period. The three axes of the cube are, for example, an inlet temperature and pressure, and an outlet pressure. Further, the selection of the heat conditions is performed for the data of each constant performance period in a small cube (cube QB2). In each small cube, the efficiency is determined to be one value by averaging or the like.

According to this configuration, by introducing the idea of the constant performance period and selecting the data in both the time direction and the heat condition (operation), the variation in the efficiency values can be further reduced (effect). In addition, the processing is very simple, making the confirmation of conditions and the value conversion processing easy so that the processing can be uniformly performed over the entire period.

Figure 8:
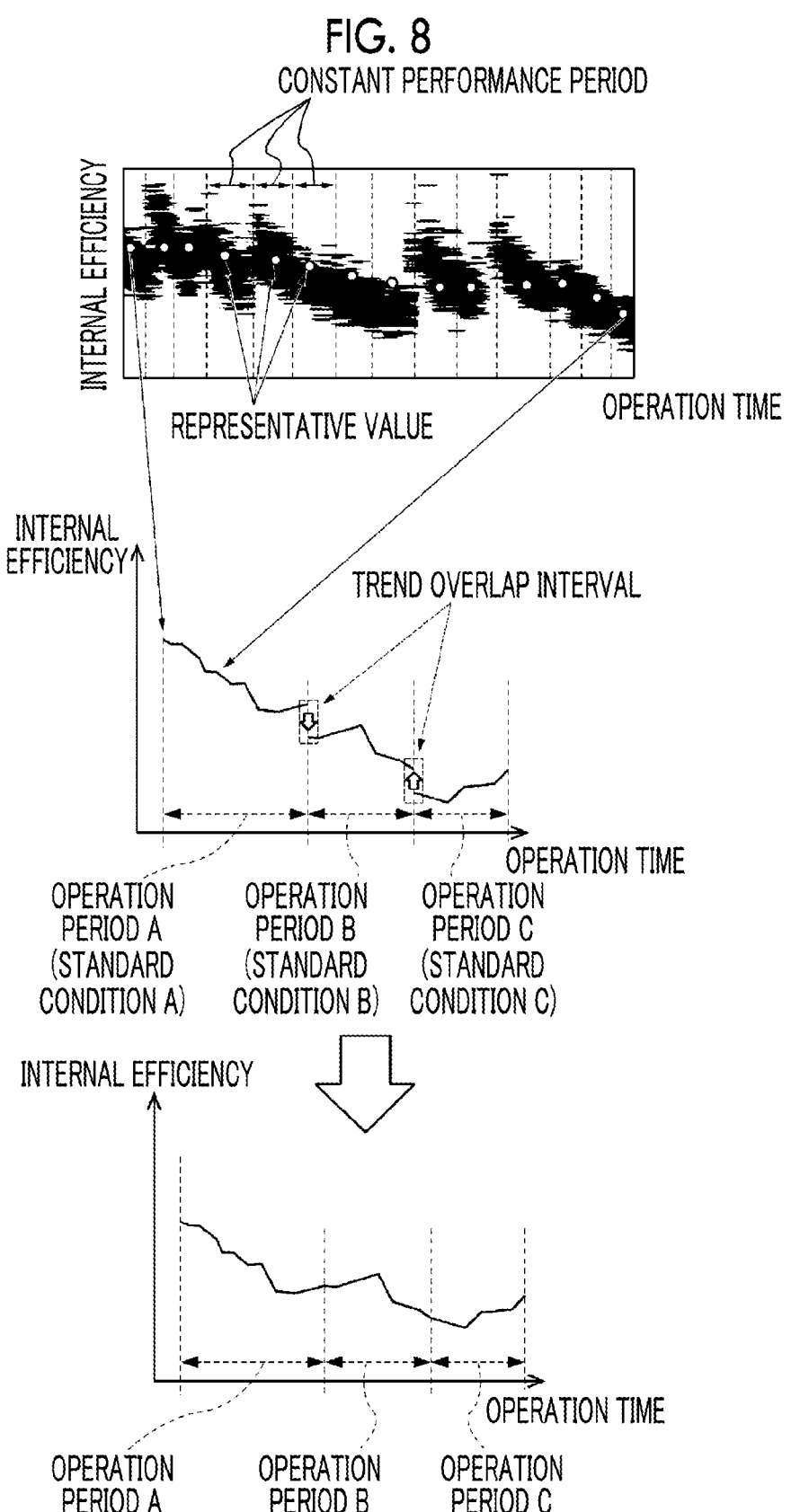
FIG. 8 is a schematic diagram for describing an operation example of the data processing device according to the embodiment of the present disclosure.

Next, the correction unit 15 shown in FIG. 1 sets a trend overlap interval (an example of an overlap period) including a boundary between two adjacent operation periods, performs selection of the time-series data in the trend overlap interval for each standard condition based on each standard condition specified for the two operation periods, and corrects a representative value in at least one of the two operation periods based on a result of calculating each representative value based on each piece of time-series data extracted by the selection. As shown in FIG. 2, the trend overlap interval is a certain period including the boundary between the two operation periods. The correction unit 15 calculates, for example, a representative value (representative value of the trend overlap interval) based on the time-series data extracted by the selection based on a standard condition A from the time-series data in the trend overlap interval. In addition, the correction unit 15 calculates, for example, a representative value (representative value of the trend overlap interval) based on the time-series data extracted by the selection based on a standard condition B from the time-series data in the same trend overlap interval. Then, for example, as shown in FIG. 8, the correction unit 15 corrects the representative value in at least one of the two operation periods A and B, based on a difference between the representative value (also referred to as a reference efficiency value) based on the standard condition A and the representative value (also referred to as a reference efficiency value) based on the standard condition B. The difference in the reference efficiency values is also referred to as an efficiency conversion value. The efficiency conversion value is calculated for the operation period C, and the representative value is corrected.

Figure 10:
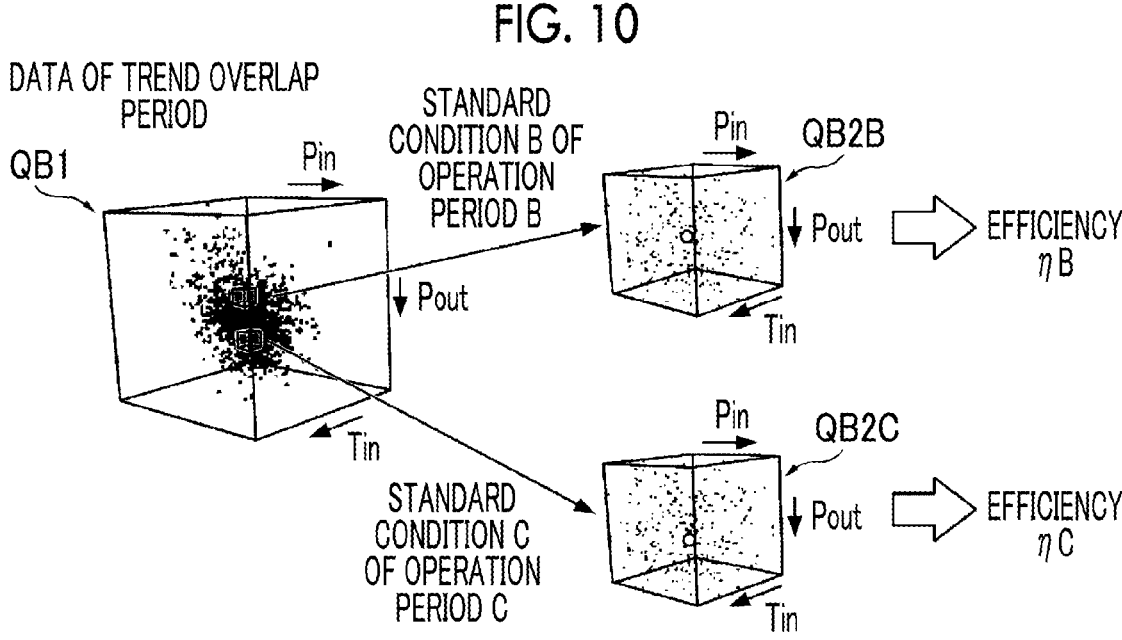
FIG. 10 is a schematic diagram for describing an operation example of the data processing device according to the embodiment of the present disclosure.

FIG. 10 shows an example of calculating the efficiency conversion value for the trend overlap period overlapping the operation period B and the operation period C by using the same method as the large-small cube method described with reference to FIG. 9. In the example shown in FIG. 10, the data of the trend overlap period is disposed in the large cube (cuboid space QB1). Then, a small cube (cube QB2B) in the vicinity of the standard condition B of the operation period B and a small cube (cube QB2C) in the vicinity of the standard condition C of the operation period C are set in the large cube (cuboid space QB1). Internal efficiency ηB is calculated based on the data in the small cube (cube QB2B), and internal efficiency ηC is calculated based on the data in the small cube (cube QB2C).

The difference between the internal efficiency ηB and the internal efficiency ηC corresponds to the conversion amount under different standard conditions, and the standard conditions can be unified by moving the entire trend in parallel. (Operation Example of Data Processing Device)

Next, an operation example of the data processing device 1 shown in FIG. 1 will be described with reference to FIGS. 4 to 11. For example, the processing shown in FIG. 4 is started according to a predetermined input operation of an operator. When the processing shown in FIG. 4 is started, for example, the acquisition unit 11 extracts steady state data (generator output, inlet temperature and pressure, outlet pressure, and the like) from the acquired plurality of types of time-series data 3 (step S11). In the present embodiment, the steady state data is data measured in a state where the operation state is considered to be substantially constant and under the heat condition (temperature, pressure, flow rate, output, and the like). Normally, the data indicates data measured in an operation state near a rated output. Next, for example, the acquisition unit 11 performs simple selection (condenser vacuum degree, governor opening degree, and the like) of the similar data (step S12). In step S12, one piece of similar data is left, and the other piece of data is excluded. Next, for example, the acquisition unit 11 removes outliers (step S13). In step S13, for example, data other than the rated output operation is excluded.

Figure 5:
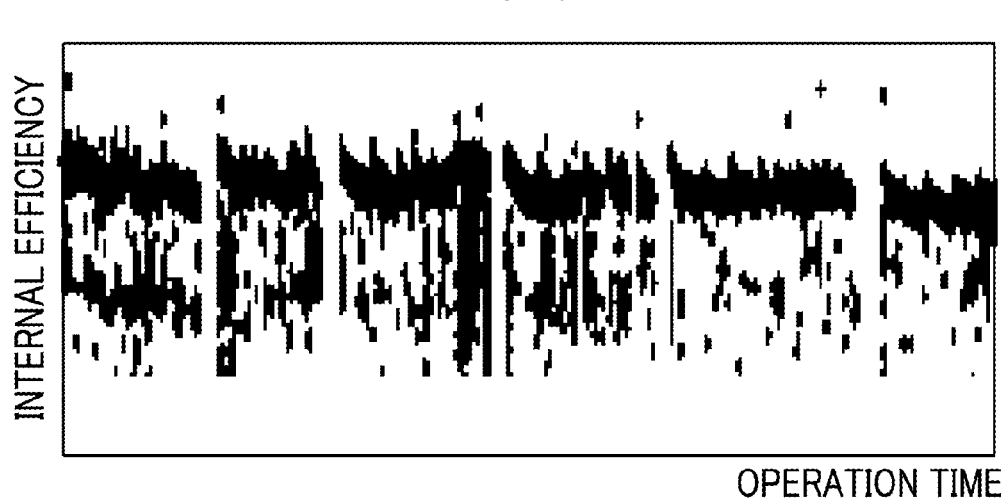
FIG. 5 is a schematic diagram for describing an operation example of the data processing device according to the embodiment of the present disclosure.
Figure 6:
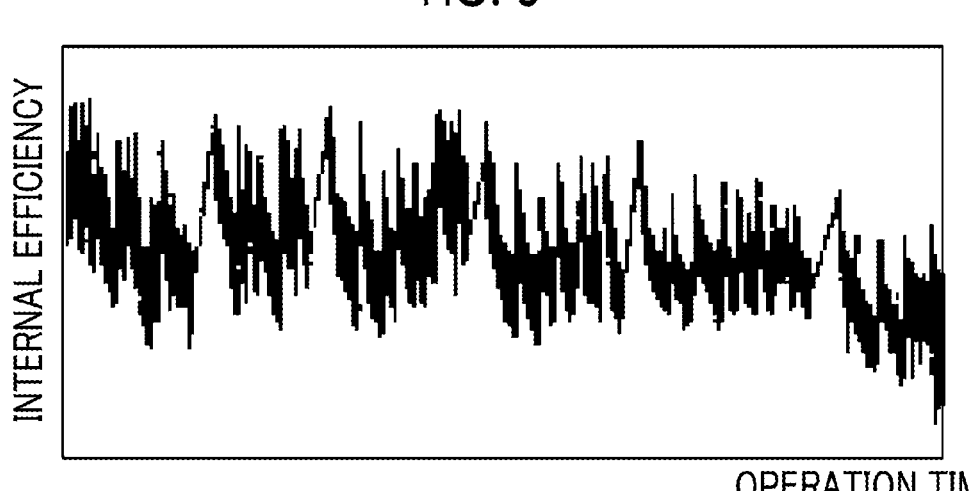
FIG. 6 is a schematic diagram for describing an operation example of the data processing device according to the embodiment of the present disclosure.

FIG. 5 shows an example of the data before the processing using the time-series data of the internal efficiency as an example. FIG. 6 shows an example of the data after the processing of steps S11 to S13 using the time-series data of the internal efficiency as an example. The scales of the internal efficiency in FIGS. 5 and 6 are different.

Next, the division unit 12 and the specifying unit 13 execute time direction division (1) (step S14). In the time direction division (1), the division unit 12 performs the period division based on the similarity of the operation conditions. In addition, the specifying unit 13 specifies the standard condition for each period.

Next, the calculation unit 14 executes time direction division and selection (2) (step S15). In the time direction division and selection (2), the calculation unit 14 performs the division in the constant performance period.

Next, the calculation unit 14 executes the data extraction and calculation of the representative efficiency value (step S16). The calculation unit 14 extracts the data in the vicinity of the standard condition for each period with respect to the constant performance period, and calculates the representative efficiency value using the data in the vicinity of the standard condition (for each constant performance period).

FIG. 7 shows an example of data processing through steps S14 to S16.

Next, the correction unit 15 calculates the efficiency conversion value (step S17). The correction unit 15 calculates a difference between the reference efficiency values of the periods having different standard conditions.

Next, the correction unit 15 generates a trend under a unified condition (step S18). The correction unit 15 calculates the efficiency under the standard condition unified over the entire period by using the difference between the reference efficiency values.

FIG. 8 shows an example of data processing through steps S17 and S18.
(Supplementary Description)

In the first embodiment, long-term operation data is divided into a plurality of consecutive periods (operation periods) based on the similarity of the operation conditions, a standard operation condition (standard condition) (for example, an average value of temperature and pressure at a turbine inlet and outlet) for each divided period is determined, and the internal efficiency is evaluated based on the standard condition.

In addition, a period in which the true turbine efficiency is considered to be constant (constant performance period) is determined, and it is assumed that the efficiency value is the same if the operation conditions of the turbine are the same during the period (if the turbine structure is the same and the heat conditions are the same, the efficiency should be the same). Then, the efficiency value in each period is defined (calculated) using the data close to the standard condition for the data of the plurality of divided constant performance periods.

In addition, for periods with different standard conditions, the efficiency values for two standard conditions are calculated by using the data of the adjacent parts (trend overlap interval). Further, according to the idea of the constant performance period, one efficiency trend graph is parallel-translated by using a shift amount (difference between two efficiency values calculated above) of the efficiency trend in a period corresponding to the different standard conditions. By performing the same processing for the remaining periods with standard conditions, the trend graph of the efficiency change is generated with the same reference (standard condition) throughout the entire period.

Operations and Effects of First Embodiment (1) By dividing the evaluation period into plurality of periods based on the similarity of the operation conditions and evaluating the internal efficiency with reference to the standard condition unique to each period (operation), even if the range of the heat condition used for the evaluation is significantly narrowed down to the values in the vicinity of the standard condition in each period, the target data is not lost (effect). That is, the data can be homogenized while preventing data loss.

(2) By introducing the idea of the constant performance period and selecting the data in both the time direction and the heat condition (operation), the variation in the efficiency values can be further reduced (effect).

(3) By applying the idea of the constant performance period to the trend overlap interval and calculating the conversion amount of the efficiency value with respect to the different standard conditions adjacent to each other (operation), it is possible to generate and evaluate the trend graph of the efficiency change with the same standard (standard condition) throughout the entire period (effect).

As described above, according to the present embodiment, it is possible to properly evaluate the performance of the target device 2 even in a case where the operation condition is changed.

Second Embodiment

Figure 11:
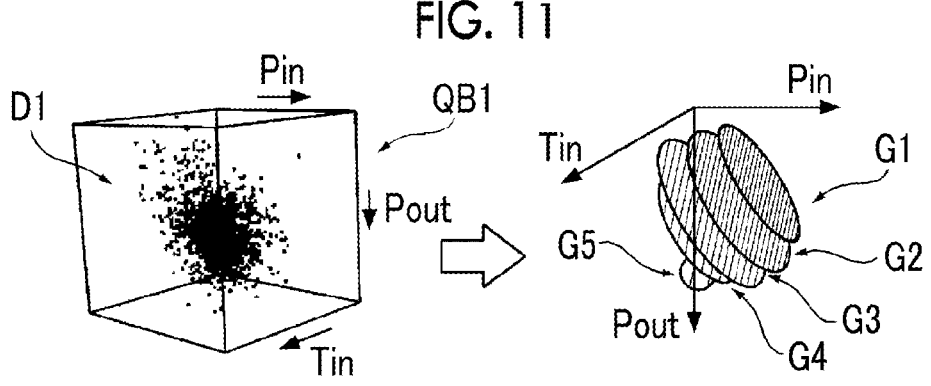
FIG. 11 is a schematic diagram for describing a data processing device according to a second embodiment of the present disclosure.

The second embodiment is another example (referred to as a multiple regression plane method in the present embodiment) of a specific example (the large-small cube method) of the selection of the time-series data based on the standard condition described with reference to FIG. 9 in the first embodiment. In the multiple regression plane method of the present embodiment, the calculation unit 14 divides the time-series data D1 included in the cube (cuboid space QB1) collected over the constant performance period and summarized under the heat condition into a plurality of groups (clusters) G1 to G5 according to the efficiency value (FIG. 11). Since only one point of data belongs to the group G5, no plane is created.

Figure 12:
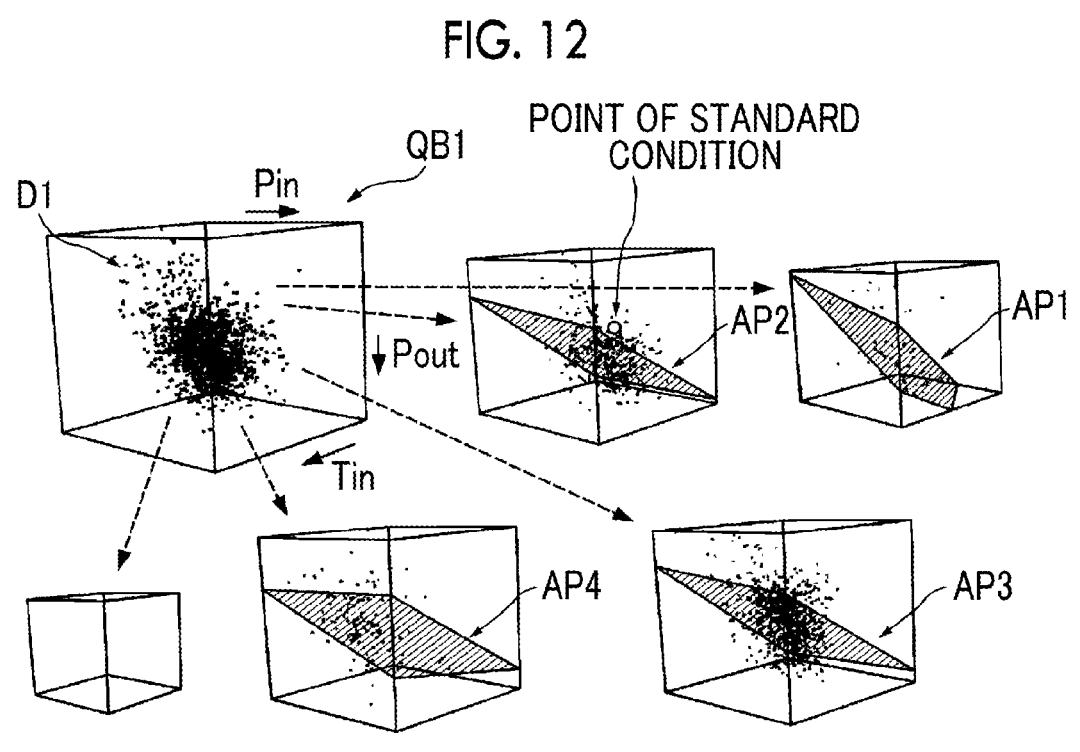

Next, the calculation unit 14 calculates linear approximation planes (multiple regression planes) AP1 to AP4 for each data divided into clusters (FIG. 12). In addition, the calculation unit 14 generates an intermediate (interpolation) regression plane of the two adjacent multiple regression planes as necessary. In addition, the calculation unit 14 generates the intermediate (interpolation) regression plane by, for example, (1) generating a normal vector as an average vector of the normal vectors of the adjacent multiple regression planes, and (2) generating a reference point (point on the plane) as an intermediate point of centroids (two points) of the data points used for generating the multiple regression plane. In a case where the point under the standard condition is not on the multiple regression plane, the interpolation is performed based on the distance from the two adjacent multiple regression planes. In addition, since the efficiency conversion is expressed as a functional relationship, extrapolation is possible (however, the accuracy is reduced in the case of a wide range of extrapolation).

FIGS. 11 and 12 are schematic diagrams for describing operation examples of the data processing device according to the second embodiment of the present disclosure.

The standard condition in the present embodiment includes values representing three of the inlet temperature, the inlet pressure, the outlet temperature, and the outlet pressure of the steam turbine, which are calculation parameters of the internal efficiency. In addition, the calculation unit 14 associates three calculation parameters corresponding to those included in the standard condition with each side, disposes the time-series data in the cuboid space QB1 set for each constant performance period, divides the time-series data into a plurality of groups G1 to G5 according to the internal efficiency, calculates the linear approximation planes AP1 to AP4 for each group, and calculates the representative value based on a positional relationship between the calculation result of the linear approximation plane and the point corresponding to the standard condition in the cuboid space.

(Operations and Effects of Second Embodiment)

By introducing the idea of the constant performance period and selecting the data in both the time direction and the heat condition (operation), the variation in the efficiency values can be further reduced (effect). In addition, since the efficiency conversion is expressed as a functional relationship, extrapolation is possible (however, the accuracy is reduced in the case of a wide range of extrapolation).

Third Embodiment

Figure 13:
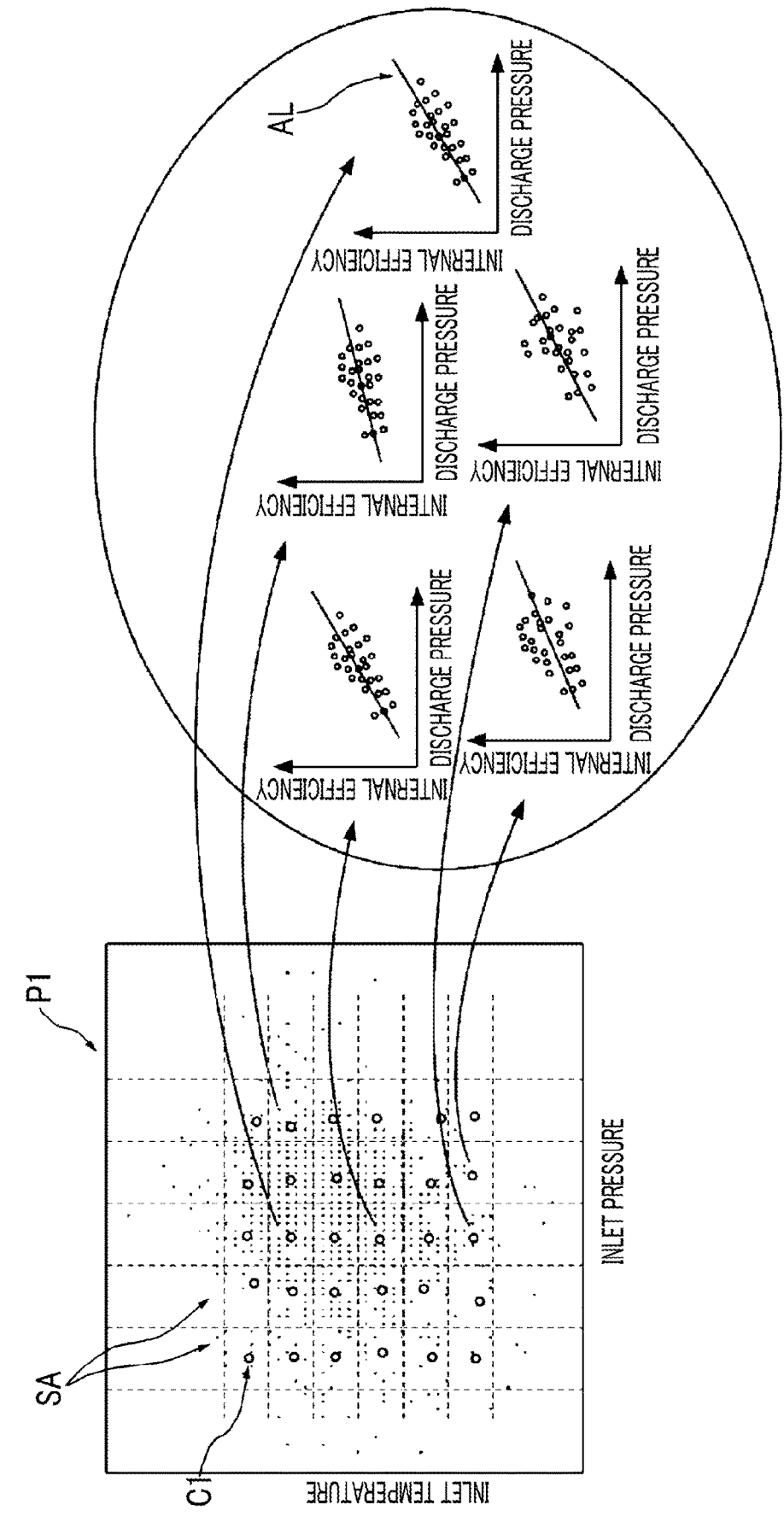
FIG. 13 is a schematic diagram for describing a data processing device according to a third embodiment of the present disclosure.

The third embodiment is another example (referred to as a multiplex linear approximation method in the present embodiment) of a specific example (the large-small cube method) of the selection of the time-series data based on the standard condition described with reference to FIG. 9 in the first embodiment. FIG. 13 is a schematic diagram for describing the data processing device according to the third embodiment of the present disclosure.

In the present embodiment, in the multiple linear approximation method, as shown in FIG. 13, the calculation unit 14 generates a two-dimensional graph (plane P1) of the temperature and the pressure of the turbine inlet for each data point group obtained by dividing the constant performance period into a plurality of parts, and divides the two-dimensional graph into several small regions SA in a grid shape. In addition, the calculation unit 14 displays the data points in each grid on the graph of the turbine outlet pressure and efficiency, obtains respective approximation lines AL for each of the data points, and calculates the efficiency value for any standard condition by using a large number of the approximation line groups.

A point C1 is a representative value of a combination of the temperature and the pressure determined for each small region SA. As the method for calculating the value at the point C1, the value can be an average value of sampling points in the small region SA or a simple coordinate average (central point position) of the small region SA.

As the method for calculating the efficiency value for any standard condition, (1) the grid is specified from the temperature and pressure values corresponding to the given standard condition, and (2) the efficiency value is calculated from an outlet pressure condition using an approximate straight line of the specified grid.

As described above, according to the present embodiment, the standard condition includes values representing three of the inlet temperature, the inlet pressure, the outlet temperature, and the outlet pressure of the steam turbine, which are the calculation parameters of the internal efficiency. In addition, the calculation unit 14 associates two of the three calculation parameters corresponding to those included in the standard condition with each axis, disposes the time-series data on the plane P1 set for each constant performance period, sets the approximation line AL of the representative value based on the remaining one of the three calculation parameters for each of the plurality of small regions SA obtained by dividing the plane P1 and specified by the standard condition, and calculates the representative value based on the standard condition and the approximation line.

(Operations and Effects of Third Embodiment)

By introducing the idea of the constant performance period and selecting the data in both the time direction and the heat condition (operation), the variation in the efficiency values can be further reduced (effect). In addition, since the efficiency conversion is expressed as a functional relationship, extrapolation is possible (however, the accuracy is reduced in the case of a wide range of extrapolation).

(Operations and Effects)

In the data processing device and the data processing method having the above configuration, the target period is divided into a plurality of operation periods according to the operation conditions. In addition, the standard condition, which is the standard operation condition for each operation period, is specified. In addition, each operation period is divided into a plurality of constant performance periods in which the performance of the target device is considered to be constant, the selection of the time-series data based on the standard condition is performed for each constant performance period, and a predetermined representative value is calculated based on the time-series data extracted by the selection. In addition, an overlap period including a boundary between two adjacent operation periods is set, selection of the time-series data in the overlap period is performed for each standard condition based on each standard condition specified for the two operation periods, and a representative value in at least one of the two operation periods is corrected based on a result of calculating each representative value based on each piece of time-series data extracted by the selection. Therefore, according to the data processing device and the data processing method of the embodiment, it is possible to properly evaluate the performance of the target device even in a case where the operation condition is changed.

Other Embodiments

The embodiment of the present disclosure has been described in detail above with reference to the drawings. However, the specific configurations are not limited to the embodiment, and also include design changes or the like within a scope that does not deviate from the gist of the present disclosure.

<Computer Configuration>

Figure 14:
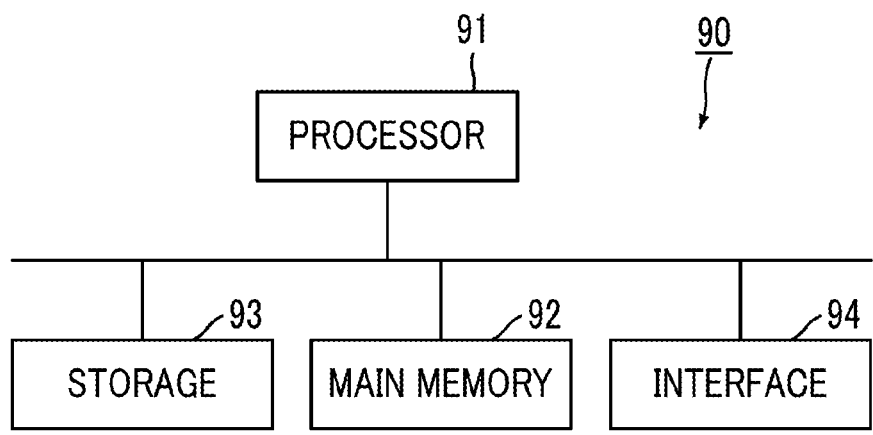
FIG. 14 is a schematic block diagram showing a configuration of a computer according to at least one embodiment.

FIG. 14 is a schematic block diagram showing a configuration of a computer according to at least one embodiment.

A computer 90 includes a processor 91, a main memory 92, a storage 93, and an interface 94.

The data processing device 1 described above is implemented in the computer 90. An operation of each processing unit described above is stored in the storage 93 in the form of a program. The processor 91 reads the program from the storage 93, deploys the program in the main memory 92, and performs the above-described processing in accordance with the program. In addition, the processor 91 secures a storage area corresponding to each storage unit described above in the main memory 92 in accordance with the program.

The program may be a program for realizing some of the functions fulfilled by the computer 90. For example, the program may be a program that fulfills the functions in combination with other programs already stored in the storage or in combination with other programs installed in other devices. In another embodiment, the computer may include a custom large scale integrated circuit (LSI) such as a programmable logic device (PLD), in addition to the configuration or instead of the configuration. Examples of the PLD include a programmable array logic (PAL), a generic array logic (GAL), a complex programmable logic device (CPLD), and a field-programmable gate array (FPGA). In this case, some or all of the functions realized by the processor may be realized by the integrated circuit.

Examples of the storage 93 include a hard disk drive (HDD), a solid-state drive (SSD), a magnetic disk, a magneto-optical disk, a compact disc read-only memory (CD-ROM), a digital versatile disc read-only memory (DVD-ROM), and a semiconductor memory. The storage 93 may be an internal medium directly connected to a bus of the computer 90, or may be an external medium connected to the computer 90 via the interface 94 or a communication line. In addition, in a case where the program is distributed to the computer 90 via the communication line, the computer 90 that has received the distribution may deploy the program in the main memory 92 and execute the processing. In at least one embodiment, the storage 93 is a non-transitory tangible storage medium.

<Appendix>

The data processing device 1 described in each embodiment is understood as follows, for example.

(1) A data processing device 1 according to a first aspect includes an acquisition unit 11 that acquires a plurality of types of time-series data 3 over a target period related to an operation of a target device 2, a division unit 12 that divides the target period into a plurality of operation periods according to operation conditions, a specifying unit 13 that specifies a standard condition, which is a standard operation condition, for each operation period, a calculation unit 14 that divides each operation period into a plurality of constant performance periods in which a performance of the target device is considered to be constant, that performs selection of the time-series data based on the standard condition for each constant performance period, and that calculates a predetermined representative value based on the time-series data extracted by the selection, and a correction unit 15 that sets an overlap period (trend overlap interval) including a boundary between two adjacent operation periods, that performs selection of the time-series data within the overlap period for each standard condition based on each standard condition specified for the two operation periods, and that corrects the representative value in at least one of the two operation periods based on a result of calculating each representative value based on each piece of time-series data extracted by the selection. According to the present aspect and each aspect below, it is possible to properly evaluate the performance of the target device even in a case where the operation condition is changed.

(2) In the data processing device 1 according to a second aspect, according to the data processing device 1 of (1), the calculation unit excludes at least one type of the time-series data of a plurality of types of the time-series data used as a parameter when calculating the representative value from the selection based on the standard condition.

(3) In the data processing device 1 according to a third aspect, according to the data processing device 1 of (1) or (2), the representative value is a value corresponding to efficiency of the target device.

(4) In the data processing device 1 according to a fourth aspect, according to the data processing device 1 of (1) to (3), the target device is a steam turbine 21, and the representative value is internal efficiency of the steam turbine.

(5) In the data processing device 1 according to a fifth aspect, according to the data processing device 1 of (1) to (4), the standard condition includes values representing three of an inlet temperature, an inlet pressure, an outlet temperature, and an outlet pressure of the steam turbine, which are calculation parameters of the internal efficiency, and the calculation unit associates the three calculation parameters corresponding to the values included in the standard condition with each side, disposes the time-series data in a cuboid space set for each constant performance period, and calculates the representative value based on the time-series data disposed in a predetermined cube in a vicinity of the standard condition.

(6) In the data processing device 1 according to a sixth aspect, according to the data processing device 1 of (1) to (4), the standard condition includes values representing three of an inlet temperature, an inlet pressure, an outlet temperature, and an outlet pressure of the steam turbine, which are calculation parameters of the internal efficiency, and the calculation unit associates the three calculation parameters corresponding to the values included in the standard condition to each side, disposes the time-series data in a cuboid space set for each constant performance period, divides the time-series data into a plurality of groups according to the internal efficiency, calculates a linear approximation plane for each group, and calculates the representative value based on a positional relationship between a calculation result of the linear approximation plane and a point corresponding to the standard condition in the cuboid space.

(7) In the data processing device 1 according to a seventh aspect, according to the data processing device 1 of (1) to (4), the standard condition includes values representing three of an inlet temperature, an inlet pressure, an outlet temperature, and an outlet pressure of the steam turbine, which are calculation parameters of the internal efficiency, and the calculation unit associates two of the three calculation parameters corresponding to the values included in the standard condition with each axis, disposes the time-series data on a plane set for each constant performance period, sets an approximation line of the representative value based on the remaining one of the three calculation parameters for each of a plurality of small regions obtained by dividing the plane and specified by the standard condition, and calculates the representative value based on the standard condition and the approximation line.

INDUSTRIAL APPLICABILITY

According to the data processing device and the data processing method of the present disclosure, it is possible to properly evaluate the performance of the target device even in a case where the operation condition is changed.

REFERENCE SIGNS LIST

1 data processing device
2 target device
21 steam turbine
11 acquisition unit
12 division unit
13 specifying unit
14 calculation unit
15 correction unit

The invention claimed is:

1. A data processing device comprising:
an acquisition unit that acquires a plurality of types of time-series data over a target period related to an operation of a target device;
a division unit that divides the target period into a plurality of operation periods according to operation conditions;
a specifying unit that specifies a standard condition, which is a standard operation condition, for each operation period;
a calculation unit that divides each operation period into a plurality of constant performance periods in which a performance of the target device is considered to be constant, that performs selection of the time-series data based on the standard condition for each constant performance period, and that calculates a predetermined representative value based on the time-series data extracted by the selection; and
a correction unit that sets an overlap period including a boundary between two adjacent operation periods, that performs selection of the time-series data within the overlap period for each standard condition based on each standard condition specified for the two operation periods, and that corrects the representative value in at least one of the two operation periods based on a result of calculating each representative value based on each piece of time-series data extracted by the selection.

2. The data processing device according to claim 1, wherein the calculation unit excludes at least one type of the time-series data of a plurality of types of the time-series data used as a parameter when calculating the representative value from the selection based on the standard condition.

3. The data processing device according to claim 2, the representative value is a wherein value corresponding to efficiency of the target device.

4. The data processing device according to claim 3, wherein the target device is a steam turbine, and the representative value is internal efficiency of the steam turbine.

5. The data processing device according to claim 4, wherein the standard condition includes values representing three of an inlet temperature, an inlet pressure, an outlet temperature, and an outlet pressure of the steam turbine, which are calculation parameters of the internal efficiency, and
the calculation unit associates the three calculation parameters corresponding to the values included in the standard condition with each side, disposes the time-series data in a cuboid space set for each constant performance period, and calculates the representative value based on the time-series data disposed in a predetermined cube in a vicinity of the standard condition.

6. The data processing device according to claim 4, wherein the standard condition includes values representing three of an inlet temperature, an inlet pressure, an outlet temperature, and an outlet pressure of the steam turbine, which are calculation parameters of the internal efficiency, and the calculation unit associates the three calculation parameters corresponding to the values included in the standard condition to each side, disposes the time-series data in a cuboid space set for each constant performance period, divides the time-series data into a plurality of groups according to the internal efficiency, calculates a linear approximation plane for each group, and calculates the representative value based on a positional relationship between a calculation result of the linear approximation plane and a point corresponding to the standard condition in the cuboid space.

7. The data processing device according to claim 4, wherein the standard condition includes values representing three of an inlet temperature, an inlet pressure, an outlet temperature, and an outlet pressure of the steam turbine, which are calculation parameters of the internal efficiency, and the calculation unit associates two of the three calculation parameters corresponding to the values included in the standard condition with each axis, disposes the time-series data on a plane set for each constant performance period, sets an approximation line of the representative value based on the remaining one of the three calculation parameters for each of a plurality of small regions obtained by dividing the plane and specified by the standard and condition, calculates the representative value based on the standard condition and the approximation line.

8. A data processing method comprising:

a step of acquiring a plurality of types of time-series data over a target period related to an operation of a target device;

a step of dividing the target period into a plurality of operation periods according to operation conditions;

a step of specifying a standard condition, which is a standard operation condition, for each operation period;

a step of dividing each operation period into a plurality of constant performance periods in which a performance of the target device is considered to be constant, performing selection of the time-series data based on the standard condition for each constant performance period, and calculating a predetermined representative value based on the time-series data extracted by the selection; and a step of setting an overlap period including a boundary between two adjacent operation periods, performing selection of the time-series data within the overlap period for each standard condition based on each standard condition specified for the two operation periods, and correcting the representative value in at least one of the two operation periods based on a result of calculating each representative value based on each piece of time-series data extracted by the selection.

\* \* \* \* \*